(12) United States Patent
Matsumoto (10) Patent No.: US 7,795,841 B2
(45) Date of Patent: Sep. 14, 2010

(54) CHARGING SYSTEM INCLUDING USER PROXIMITY DETECTION TO START OR STOP CHARGING

(75) Inventor: Kazuaki Matsumoto, Kariya (JP)

(73) Assignee: Denso Corporation, Kariya (JP)

( * ) Notice: Subject to any disclaimer, the term of this patent is extended or adjusted under 35 U.S.C. 154(b) by 177 days.

(21) Appl. No.: 12/235,950

(22) Filed: Sep. 23, 2008

(65) Prior Publication Data

US 2009/0085522 A1 Apr. 2, 2009

(30) Foreign Application Priority Data

Sep. 27, 2007 (JP) .............................. 2007-251815

(51) Int. Cl.
*H02J 7/00* (2006.01)
(52) U.S. Cl. ................. 320/109; 320/108; 320/DIG. 12
(58) Field of Classification Search ................ 320/108, 320/109, DIG. 12
See application file for complete search history.

(56) References Cited

U.S. PATENT DOCUMENTS 5,654,621 A * 8/1997 Seelig ........................ 320/108
6,185,501 B1 * 2/2001 Smith et al. .................. 701/200
6,373,380 B1 * 4/2002 Robertson et al. ......... 340/425.5

FOREIGN PATENT DOCUMENTS

| JP | 06-121407 | 4/1994 |
| JP | 09-106861 | 4/1997 |
| JP | 09-182212 | 7/1997 |
| JP | 11-318004 | 11/1999 |
| JP | 2003-304649 | 10/2003 |
| JP | 2007-228695 | 9/2007 |

* cited by examiner

*Primary Examiner*—Edward Tso
*Assistant Examiner*—Manuel Hernandez
(74) *Attorney, Agent, or Firm*—Nixon & Vanderhye PC (57) ABSTRACT

A charging system and method is capable of starting or stopping charging a battery of a vehicle at a convenient time. A portable device and a vehicle unit can communicate with each other. A user is determined to be away from the vehicle based on a result of communication between the portable device and the vehicle unit. A charging ECU starts charging a battery when the user is away from the vehicle. Charging of the battery can be started when the user is assumed to have stopped using the vehicle and will not use the vehicle for a period of time. When the user is determined to be close to the vehicle it is assumed that use of the vehicle will be resumed at which point the system instructs the charging of the battery to be stopped. The system thereby allows the vehicle to be ready for use.

11 Claims, 4 Drawing Sheets

“CHARGING SYSTEM INCLUDING USER PROXIMITY DETECTION TO START OR STOP CHARGING”

CROSS REFERENCE TO RELATED APPLICATIONS

The present application is based on and claims priority to Japanese Application No. 2007-251815, filed Sep. 27, 2007, the entire contents of which are incorporated herein by reference.

BACKGROUND OF THE INVENTION

1. Field of the Invention

The present invention relates to a charging system used for a vehicle such as an electric car or plug-in hybrid vehicle that requires charging of a battery.

2. Description of the Related Art

Examples of a conventional charging system are described in JP-H6-121407 A and JP-H9-182212 A.

According to the system described in JP-H6-121407 A, the electric car has a charging terminal that can be operated when interlocked with a key. Turning off the key of the electric car allows the charging terminal to be pulled out. When the electric car parks at a specified position of a parking area provided with a charging facility, a charging terminal of the charging facility contacts with the charging terminal of the electric car for charging.

The system described in JP-H9-182212 A specifies a charging and stopping area for the electric car so that a power receiving coupler provided at a front bottom area of the electric car is positioned within an allowable range of movement of a power transmitting coupler of a battery charger. The front of the battery charger is provided with two proximity sensors for detecting whether and where the electric car stops. The two proximity sensors are positioned at a specified interval in a vehicle width direction corresponding to the height of a member to be detected on a front bumper. When the electric car enters the charging and stopping area and the two proximity sensors turn on, the display of the battery charger displays a message such as "correct stop position confirmed" and the battery charge starts. A driver is notified as to whether the vehicle correctly stops at the charging and stopping area.

The above described systems can facilitate charging operations or confirm correct parking at a chargeable position. However, these systems give no consideration for timing to start or stop charging and may be inconvenient for drivers. For example, after the vehicle is stopped at the charging and stopping area for charging and immediately after the charging is started, the vehicle may be required to start for some reason. However in such case, the charging must be completed and thus, disadvantageously, the vehicle may not be able to be immediately started.

SUMMARY OF THE INVENTION

The present invention has been made in consideration of the foregoing. It is therefore an object of the present invention to provide a charging system capable of starting or stopping a battery charging operation according to a convenient timing.

In order to achieve the above-mentioned object, an exemplary charging system according to a first aspect includes a battery charger that is installed near a position for parking a vehicle and charges a battery mounted on the vehicle, a portable device that is carried by a driver of the vehicle, user of the vehicle, or the like, referred to hereinafter for simplicity as the driver, is provided with a communication function, a vehicular communication device mounted on the vehicle for communication with the portable device, and a battery charging control section mounted on the vehicle. The charging control section starts charging the battery when the driver is determined to be away from the vehicle and stops charging the battery when the driver or driver is determined to be close to the vehicle. The driver is determined to be away from or close to the vehicle based on a result of communication between the vehicular communication device and the portable device The charging system starts charging the battery when the driver is determined to be away from the vehicle based on a result of communication between the portable device and the vehicular communication device. The charging system can start charging the battery at a time when the driver is assumed to have stopped using the vehicle and is assumed not to require the use of the vehicle for a period of time. When the driver is determined to be close to the vehicle, the driver is assumed to start using the vehicle. In such case, the system can stop charging the battery allowing the vehicle to be ready for use by the driver.

According to a second aspect, the battery charger includes a battery charger communication device. The battery charger communication device communicates with the portable device. The battery charger starts a charging operation when a driver is determined to be away from the battery charger based on a communication result. The battery charger stops a charging operation when a driver is determined to be close to the battery charger based on a communication result. Even when the charging system controls the battery charger so as to start and stop the charging operation based on a result of communication between the portable device and the battery charger communication device, the battery charger can start and stop the actual charging of the battery of the vehicle at almost the same time as the charging operation is started and stopped.

According to a third aspect, the battery charger includes a battery charger communication device. The battery charging control section provides an instruction directing the battery charger to start the charging of the battery and provides an instruction directing the battery charger to stop the charging of the battery. An instruction from the battery charging control section is supplied to the battery charger through communication between the vehicular communication device and the battery charger communication device. When the vehicle parks for charging, the vehicle maintains as nearly as possible a constant positional relation with the battery charger. An instruction from the battery charging control section can be reliably transmitted to the battery charger through communication between the vehicular communication device and the battery charger communication device. Since the battery charging control section supplies an instruction to the battery charger, the battery charging control section of the vehicle can start or stop the charging control at the same timing as the battery charger starts or stops the charging operation. The battery can be charged smoothly.

According to a fourth aspect, the battery charger includes a battery charger communication device. The battery charger communication device communicates with the portable device. The battery charger starts charging when a driver is determined to be away from the battery charger based on a communication result. The battery charger stops charging when a driver is determined to be close to the battery charger based on a communication result. The battery charging control section instructs the battery charger to start charging for starting charging of the battery and instructs the battery charger to stop charging for stopping charging of the battery. An instruction from the battery charging control section is supplied to the battery charger through communication between the vehicular communication device and the battery charger communication device. The battery charger starts and stops a charging operation in the battery charger based on a result of communication with the portable device or an instruction from the battery charging control section whichever is acquired first.

According to a fifth aspect, the portable device transmits a specific ID code to the vehicular communication device so as to communicate with the vehicular communication device. The battery charging control section starts or stops charging the battery based on a result of communication with the portable device when an ID code received by the vehicular communication device matches a registered ID code. The charging system can start or stop charging the battery only based on a result of communication with the portable device carried by the authenticated driver of the vehicle.

According to a sixth aspect, the portable device transmits a specific ID code to the battery charger communication device when communicating with the battery charger communication device. The battery charger starts or stops a charging operation in the battery charger based on a result of communication with the portable device when an ID code received by the battery charger communication device matches a registered ID code. Only a vehicle assigned with the registered ID code can be charged or billed in accordance with the amount of charging. When the battery charger starts charging based on an instruction from the battery charging control section, the same effect is provided by transmitting the instruction containing the ID code to the battery charger.

According to a seventh aspect, the vehicular communication device provides a specified range of communication area around the vehicle and repeatedly transmits a request signal in the communication area. The portable device enters the communication area, receives the request signal, and returns a response signal in response to the request signal. In such case, the battery charging control section can determine a driver to be away from a vehicle when the vehicular communication device becomes incapable of receiving the response signal. The battery charging control section can determine a driver to be close to a vehicle when the vehicular communication device becomes capable of receiving the response signal.

According to an eighth aspect, the vehicular communication device periodically transmits the request signal when the vehicle parks with a door thereof locked. When the driver leaves the vehicle without locking the door, it is assumed that the driver will return to the vehicle soon and resume use of the vehicle. Accordingly, it may be advantageous to transmit the request signal only when the vehicle door is locked. The charging system can start charging when it is assumed that the driver will not use the vehicle for a period of time.

According to a ninth aspect, the charging system includes a lock operation section provided for a door of the vehicle, the lock operation section providing a lock instruction, an unlock operation section provided for a door of the vehicle, the unlock operation section providing an unlock instruction, and a lock/unlock control section that locks or unlocks a door of the vehicle in accordance with an operation of a driver on the lock operation section and the unlock operation section. When an ID code contained in a response signal received by the vehicular communication device matches a registered ID code, the battery charging control section outputs an enabling signal that enables the lock/unlock control section to lock or unlock a door of the vehicle.

It should be noted that with regard to the lock/unlock action only, the above-mentioned construction can be provided in a commercially available smart entry system, which can include a portable device and/or a vehicle unit.

According a tenth aspect, the communication device is provided with a lock operation section to be operated for a lock instruction and an unlock operation section to be operated for an unlock instruction. The lock operation section is operated to transmit a lock signal. The unlock operation section is operated to transmit an unlock signal. The vehicle includes a lock/unlock control section that locks or unlocks a door of the vehicle in response to reception of the lock signal or the unlock signal by the vehicular communication device. The battery charging control section determines a driver to be away from a vehicle when the vehicular communication device receives the lock signal. The battery charging control section determines a driver to be close to a vehicle when the vehicular communication device receives the unlock signal.

It should be noted that with regard to the lock/unlock action only, the above-mentioned construction can be provided in a commercially available keyless entry system, which can include a portable device and/or a vehicle unit.

Accordingly while it is known for a vehicle to be constructed to have functions such as the smart entry system and the keyless entry system, the operation of a charging system in connection with such entry systems as disclosed herein is new.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF EXEMPLARY EMBODIMENTS

Figure 1:
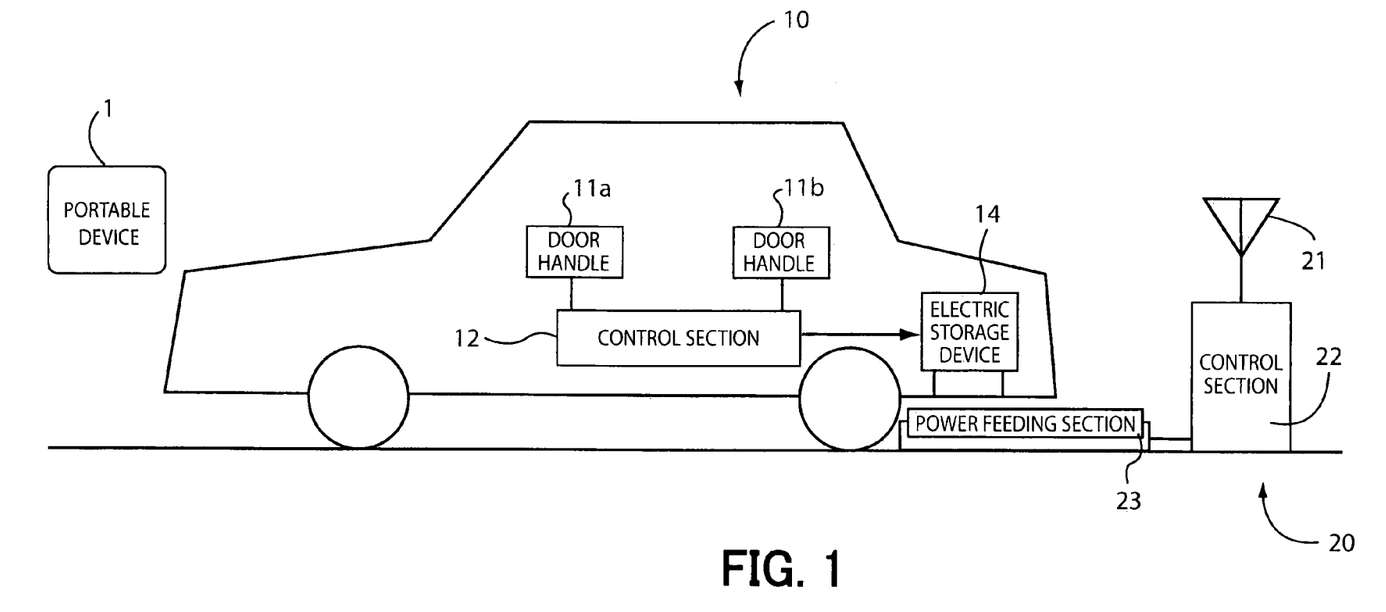
FIG. 1 is a diagram illustrating an exemplary overall configuration of a charging system according to an embodiment.

The charging system according to the present embodiment will be described with reference to the accompanying drawings. As shown in FIG. 1, the charging system according to the present embodiment mainly includes a portable device 1 as an electronic key, a vehicle unit 10, and a battery charger 20.

The portable device 1 is carried by a driver, a user, or the like, such as a vehicle driver and has a function of communicating with the vehicle unit 10 and the battery charger 20. The embodiment uses the communication function of the portable device 1 to determine whether the driver or the vehicle moves away from or close to the battery charger.

The vehicle unit 10 includes antennas 11a and 11b and a control section 12 for communication with the portable device 1. Based on a result of communication with the portable device 1, the vehicle unit 10 controls a charging state of an electric storage device 14 such as a starting charging state or a stopping charging state. In addition, the vehicle unit 10 controls a lock or unlock state of vehicle doors.

The battery charger 20 mainly includes an antenna 21, a control section 22, and a power feeding section 23 and is installed near a location where a vehicle parks. When the vehicle parks at a position specified for the battery charger 20, the battery charger 20 supplies power and charges the electric storage device 14.

The following describes in more detail the portable device 1, the vehicle unit 10, and the battery charger 20. With reference to the block diagram in FIG. 2, a control unit is shown for controlling the door lock or unlock state only on the right side of the vehicle for the sake of convenience. The control unit is provided for each door. The control unit may be provided for respective doors for each front seat or for only the driver seat door.

Figure 2:
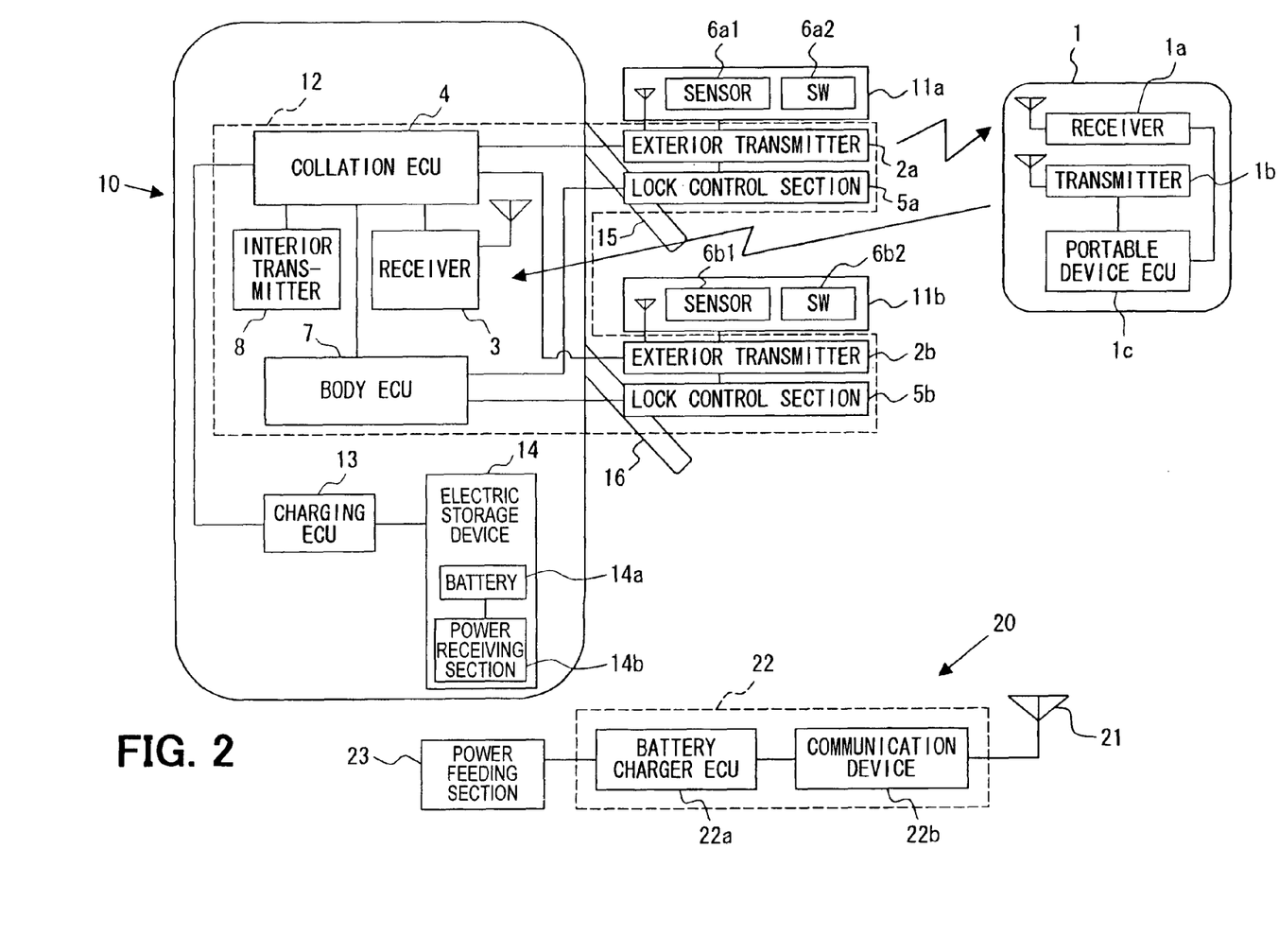
FIG. 2 is a block diagram illustrating exemplary configurations of a portable device, a vehicle unit, and a battery charger.

As shown in FIG. 2, the portable device 1 includes a receiver 1a and a transmitter 1b. The receiver 1a receives a request signal from exterior transmitters 2a and 2b or an interior transmitter 8 of the vehicle unit 10. The transmitter 1b transmits a response signal including a unique ID code in response to reception of the request signal. A portable device electronic control unit (ECU) 1c is connected to the receiver 1a and the transmitter 1b and performs various control processes. Based on a signal received from the receiver 1a, the portable device ECU 1c determines whether a request signal is received. In response to the request signal, the portable device ECU 1c generates a response signal including an ID code and allows the transmitter 1b to transmit the response signal.

Though not shown, the portable device 1 is provided with a lock button for locking the vehicle door and an unlock button for unlocking the same. When the driver operates either button, the portable device ECU 1c allows the transmitter 1b to transmit a lock signal or an unlock signal as well as the above-mentioned ID code.

The vehicle unit 10 includes exterior transmitters 2a and 2b and an interior transmitter 8. The exterior transmitters 2a and 2b are provided for doors 15 and 16 of the vehicle. The interior transmitter 8 is provided in the vehicle compartment The exterior transmitters 2a and 2b and the interior transmitter 8 generate request signals based on a transmission enabling signal from a collation ECU 4.

The exterior transmitters 2a and 2b generate a request signal in a transmission range of several meters, for example. When the vehicle parks with the doors 15 and 16 locked, a communication area corresponding to the transmission range of the request signal is formed around the door 15 or 16. The vehicle unit 10 can detect whether the driver carrying the portable device 1 moves away from or close to the vehicle. The interior transmitter 8 generates a communication area so as to cover the inside of the vehicle compartment. The communication area is used to detect whether the portable device 1 is available in the vehicle compartment.

The vehicle unit 10 includes a receiver 3 provided inside the vehicle compartment. The receiver 3 is ready for receiving a response signal in synchronization with the transmission enabling signal output to the transmitters 2a, 2b, and 8 and receives a response signal transmitted from the portable device 1. The response signal received by the receiver 3 is supplied to the collation ECU 4. The collation ECU 4 collates, or otherwise compares, a specified relation such as match between the ID code contained in the received response signal and an already registered code.

When a collation result shows that the specified relation is satisfied, the collation ECU 4 outputs a control signal to a body ECU 7 so as to control the lock or unlock state of the doors 15 and 16. When the collation result is acquired with the doors 15 and 16 locked, for example, the collation ECU 4 outputs a signal for unlocking the door to the body ECU 7. As will be described later, the body ECU 7 turns on touch switches 6a1 and 6b1 provided for the door handles 11a and 11b to allow the driver to operate door handles 11a and 11b. When the touch switches 6a1 and 6b1 detect a driver operation, the body ECU 7 outputs an unlock instruction to a lock control section 5a or 5b to unlock the door 15 or 16. On the other hand, the collation result may be acquired with the door 15 or 16 unlocked. A driver operation may be detected to operate door lock switches 6a2 and 6b2 to be described later. In such case, the body ECU 7 outputs a lock instruction to the lock control section 5a or 5b to lock the door 15 or 16.

When the collation ECU 4 receives the lock or unlock signal from the portable device 1, the collation ECU 4 also outputs a control signal corresponding to the received signal to the body ECU 7.

The collation ECU 4 may detect disconnection of the communication with the portable device 1 using the exterior transmitters 2a and 2b. When detecting such change, the collation ECU 4 determines that the driver carrying the portable device 1 moves away from the vehicle. On the other hand, the collation ECU 4 may detect initiation of the communication with the portable device 1. When detecting such change, the collation ECU 4 determines that the driver carrying the portable device 1 approaches the vehicle. Based on the determination result, the collation ECU 4 instructs a charging ECU 13 to prepare for charging, start charging, cancel charging preparation, or stop charging. When instructing the charging ECU 13, the collation ECU 4 issues a charging start instruction or a charging stop instruction using at least one of the exterior transmitters 2a and 2b and issues the same instruction to the battery charger 20.

The body ECU 7 outputs a drive signal to the lock control sections 5a and 5b provided for the doors 15 and 16 so as to control the lock or unlock state of the doors 15 and 16. The lock control sections 5a and 5b include a door lock motor. When the body ECU 7 transmits a lock or unlock signal, the door lock motor rotates forward or backward in accordance with the lock or unlock signal. The door lock motor rotates to lock or unlock the vehicle doors 15 and 16.

The door handles 11a and 11b are provided for the vehicle doors 15 and 16 and function as antennas for the exterior transmitters 2a and 2b. The door handles 11a and 11b are provided with the touch switches 6a1 and 6b1. The touch switches 6a1 and 6b1 can detect that a driver of the portable device 1 touches and operates the door handles 11a and 11b. When the operation on the handle 11a or 11b is detected, the door 15 or 16 is unlocked. The door handles 11a and 11b are also provided with door lock switches 6a2 and 6b2 as push switches. The driver can lock the door 15 or 16 by operating the door lock switch 6a2 or 6b2.

The charging ECU 13 follows an instruction from the collation ECU 4 and controls the charging state of the electric storage device 14 including a battery 14a and a power receiving section 14b. When the collation ECU 4 supplies a charging preparation instruction, the charging ECU 13 opens a lid for the power receiving section 14b or lowers the power receiving section 14b toward the power feeding section 23 of the battery charger 20 so that the power receiving section 14b can receive power supplied from the power feeding section 23 of the battery charger 20. The power receiving section 14b and the power feeding section 23 are electromagnetically connected with each other to exchange power while maintaining a contactless relation. Further, the power receiving section 14b and the power feeding section 23 may be connected with each other using contacts (not shown) to exchange power.

The charging ECU 13 receives the charging start instruction following the charging preparation instruction from the collation ECU 4. The charging ECU 13 then turns on a circuit for supplying the battery 14a with the power received by the power receiving section 14b and starts charging the battery 14a with the power supplied from the battery charger 20.

In another case, the charging ECU 13 receives a charging preparation cancellation instruction following the charging preparation instruction from the collation ECU 4. The charging ECU 13 then cancels the charging preparation state by closing the lid or raising the power receiving section 14b to the original position whereupon, the vehicle is immediately ready for use by the driver.

When receiving the charging stop instruction from the collation ECU 4, the charging ECU 13 turns off the circuit for supplying the battery 14a with the power received by the power receiving section 14b. In addition, the charging ECU 13 cancels the charging preparation state by providing control similar to the case of receiving the charging preparation cancellation instruction as mentioned above.

The control section 22 of the battery charger 20 includes a battery charger ECU 22a and a communication device 22b and is capable of communication with the portable device 1 and the vehicle unit 10 through the antenna 21. In a manner similar to that described above in connection with the vehicle unit 10, the control section 22 periodically transmits a request signal to the portable device 1. The control section 22 detects the presence or absence of a response signal in response to the response signal and determines whether the driver carrying the portable device 1 moves away from or close to the battery charger 20. The control section 22 also previously stores an ID code for the portable device 1 of the vehicle that uses the battery charger 20. The control section 22 determines approach or leaving of the driver based on a change in the communication state only when the received ID code matches the stored ID code. Since the ID code is previously registered to the control section 22, only a registered vehicle can be charged or billed in accordance with the amount of charging. The battery charger 20 may be preferably provided with an image recognition apparatus or a proximity sensor to return a request signal only when the vehicle stops.

When determining that the driver is away from the battery charger 20, the battery charger ECU 22a performs a charging preparation operation, for example, by moving the power feeding section 23 to a specified position of the power receiving section 14b. The charging preparation operation is also performed when the charging preparation instruction is received from the vehicle unit 10. The battery charger ECU 22a performs the charging preparation operation based on the result of communication with the portable device 1 or the instruction from the vehicle unit 10 whichever is received first.

The battery charger 20 starts charging after a specified time elapses subsequent to the charging preparation operation or when the charging start instruction is received from the vehicle unit 10. Specifically, the battery charger 20 starts energizing the power feeding section 23 so that the power feeding section 23 supplies power to the power receiving section 14b.

After the charging preparation operation, the battery charger 20 may restart communication with the portable device 1 or may receive the charging preparation cancellation instruction from the vehicle unit 10. The battery charger ECU 22a then stops the charging preparation operation and returns the power feeding section 23 to the initial position. When receiving the charging stop instruction from the vehicle unit 10, the battery charger ECU 22a stops energizing the power feeding section 23 and returns the power feeding section 23 to the initial position.

As mentioned above, the control section 22 of the battery charger 20 transmits a request signal to communicate with the portable device 1. Instead, the control section 22 may acquire a response signal from the portable device 1 by monitoring communication between the vehicle unit 10 and the portable device 1. The battery charger 20 may perform the charging operation only based on an instruction from the vehicle unit 10 rather than a result of communication with the portable device 1. An ID code may be contained in the instruction received from the vehicle unit 10. Only a registered vehicle can be charged or billed in accordance with the amount of charging.

Figure 3:
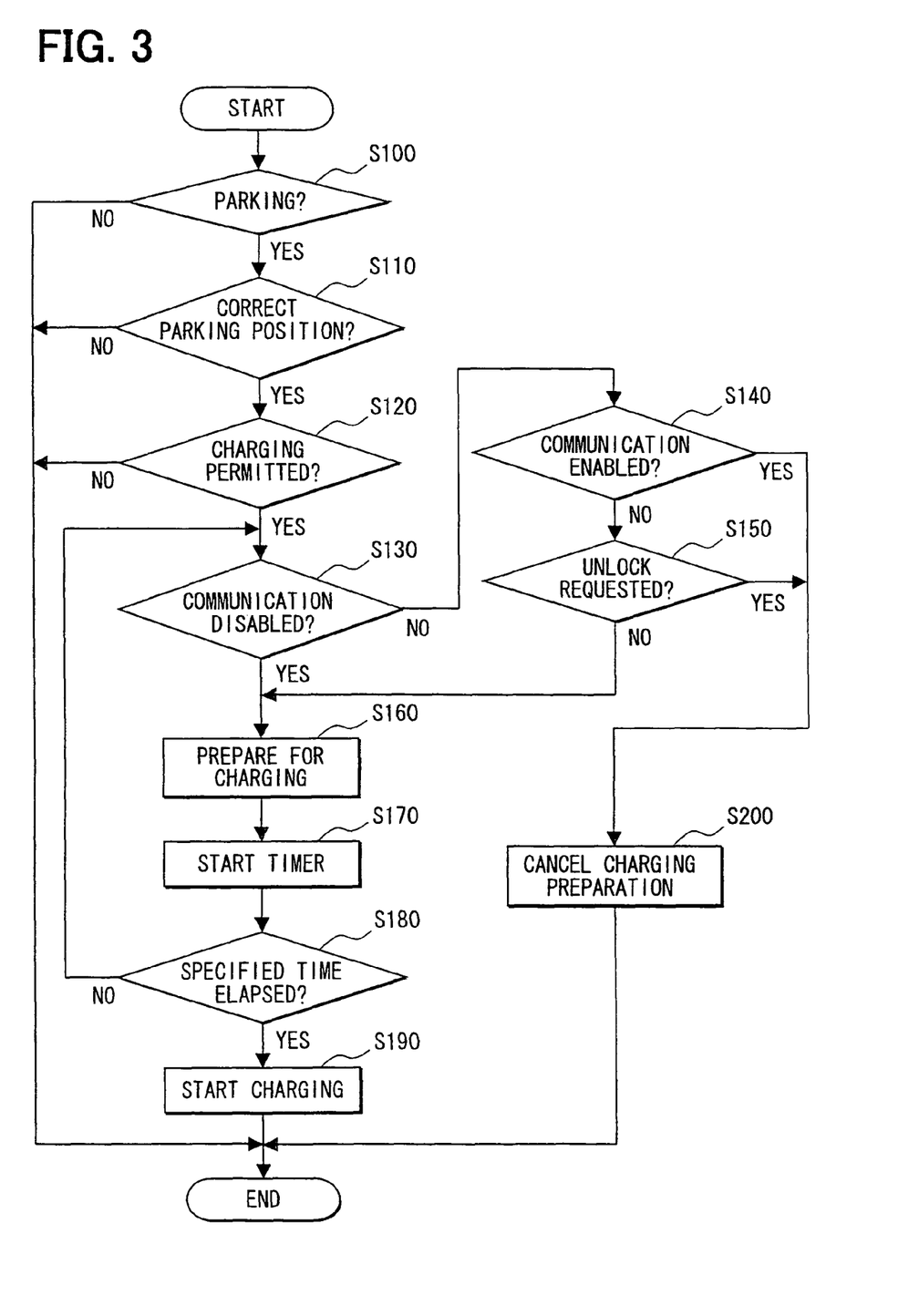
FIG. 3 is a flow chart illustrating an exemplary control process performed on a vehicle unit for starting charging in a charging system.
Figure 4:
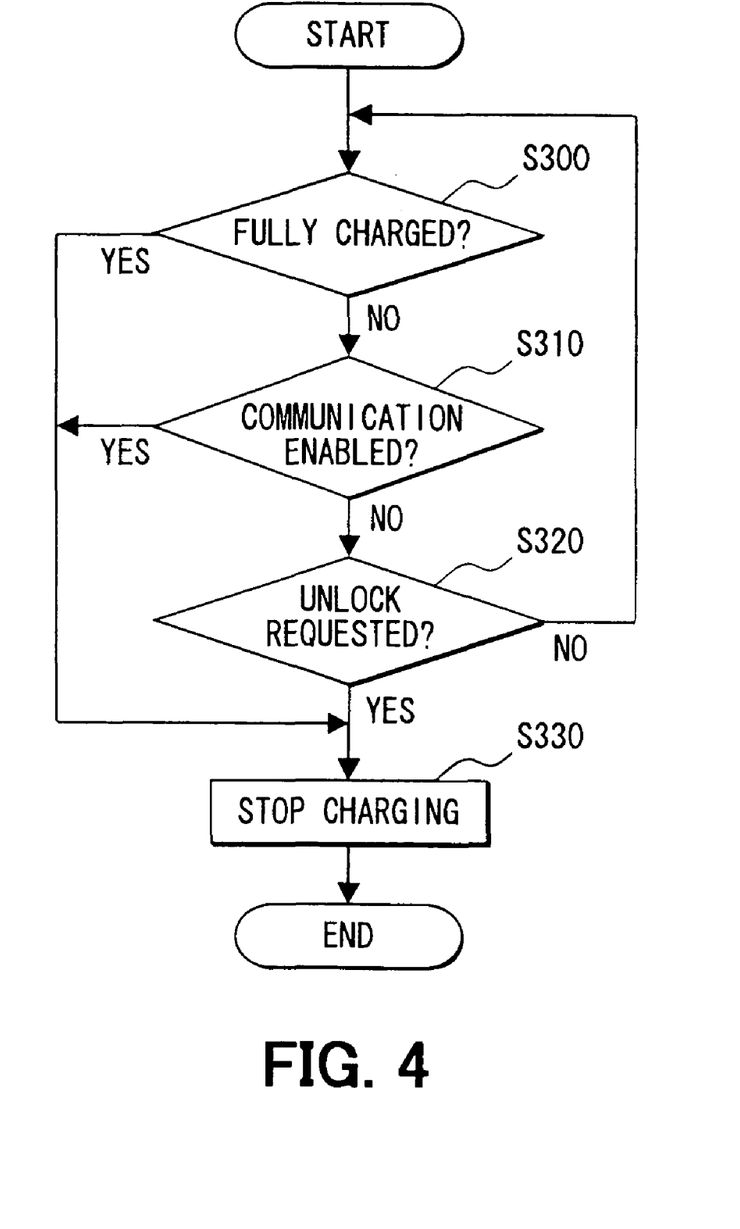
FIG. 4 is a flow chart illustrating an exemplary control process performed on a vehicle unit for stopping charging in a charging system.

With reference to flow charts in FIG. 3 and FIG. 4, the following describes details of charging control the collation ECU 4 provides based on a result of collating ID codes acquired from the communication between the vehicle unit 10 and the portable device 1. The flow chart in FIG. 3 shows a control process for starting charging, which can be initiated periodically. The flow chart in FIG. 4 shows a control process for stopping charging performed after the control process for starting charging begins.

The process for starting charging associated with FIG. 3 will be described first. At S100, the collation ECU 4 determines whether a parking condition exists, that is, whether the vehicle engine stops and the doors 15 and 16 are locked. When the parking condition exists, corresponding to YES at S100, the process proceeds to S110. When the parking condition does not exist, corresponding to NO at S100, the collation ECU 4 cannot assume that the driver has stopped using the vehicle and the process terminates. When the vehicle engine stops and the doors 15 and 16 are locked, the collation ECU 4 periodically causes the exterior transmitters 2a and 2b to transmit a request signal.

At S110, the collation ECU 4 determines whether a correct parking position condition exists, that is, whether the vehicle stops at a position capable of receiving power from the battery charger 20 and charging the battery 14a. To perform the determination, the vehicle may be provided with an image recognition apparatus or distance sensors for detecting a position with reference to the battery charger 20. The determination can use a detection result from the image recognition apparatus or the distance sensors. Alternatively, the battery charger 20 may be provided with the image recognition apparatus or the distance sensors. The collation ECU 4 may acquire a detection result through the telecommunication to perform the determination. If the correct parking position condition exists, corresponding to YES at S110, the process proceeds to S120. When the correct parking position condition does not exist, corresponding to NO at S110, the process terminates.

At S120, the collation ECU 4 determines whether a charging permitted condition exists, that is, whether the current situation is appropriate for charging and the charging is permitted. For example, the situation is inappropriate for charging when the electric storage device 14 is faulty and is incapable of normal charging or when the battery is already fully charged and does not require further charging. The situation is assumed to disallow the charging. Further, the vehicle may be provided with an infrared sensor that can detect a human body near the vehicle. When the infrared sensor detects a human near the vehicle, the situation may be assumed to be inappropriate for charging and the charging may be disallowed. The other situations are assumed to be appropriate for charging and to allow the charging. When the collation ECU 4 determines that the charging permitted condition exists, corresponding to YES at S120, the process proceeds to S130. When the collation ECU 4 determines that the charging permitted condition does not exists, the process terminates.

The exterior transmitters 2*a* and 2*b* are used for the communication with the portable device 1 to acquire a result of collating ID codes. The collation ECU 4 determines whether a communication disabled condition exists, that is, whether the communication terminates, that is, whether the driver carrying the portable device 1 stops the vehicle engine, locks the doors 15 and 16, and moves out of a transmission area for the exterior transmitters 2*a* and 2*b* whereupon the driver can be assumed to be away from the vehicle and it can be assumed that it is highly probable that the driver has stopped using the vehicle and will not use the vehicle for a while afterwards. When it is determined that the communication disabled condition exists, corresponding to YES at S130, the process proceeds to S160. The collation ECU 4 requests the charging ECU 13 to prepare for charging and issues a charging instruction to the battery charger 20. The vehicle and the battery charger 20 can start an operation for preparing to charge the battery 14*a*.

At S170, the collation ECU 4 starts a timer. At S180, the collation ECU 4 determines whether a specified time has elapsed. If the specified time has not elapsed, corresponding to a NO at S180, the process returns to S130. Once the timer starts at S170, the timer does not restart but continues timing even when the process at S170 is repeated. The process at S170 and S180 is intended to ensure that the driver carrying the portable device 1 is away from the vehicle.

When the specified time has elapsed, corresponding to a YES at S180, the process proceeds to S190. The collation ECU 4 allows the charging ECU 13 to start charging and transmits the charging start instruction to the battery charger 20. The battery charger 20 supplies power to start charging the battery 14*a*.

When it is determined that the communication disabled condition does not exist, corresponding to NO at S130, and signifying that the communication with the portable device 1 continues, the process proceeds to S140. The collation ECU 4 determines whether a communication enabled condition exists, that is, whether the discontinued communication with the portable device 1 is resumed. When it is determined that the communication enabled condition exists, corresponding to a YES at S140, the process proceeds to S200, where the collation ECU 4 issues the charging preparation cancellation instruction to the charging ECU 13 and the battery charger 20.

The determination at S140 is affirmed when the driver carrying the portable device 1 once moves away from the vehicle and again returns near the vehicle before the timer reaches the specified time interval. In such case, the driver may reuse the vehicle. As a preventive measure, the collation ECU 4 cancels the charging preparation at S200 so that the driver can immediately use the vehicle.

As mentioned above, the portable device 1 is provided with the unlock button for unlocking the vehicle door. When the unlock button is operated, the portable device 1 transmits an unlock signal whose transmission range is wider than the communication area for the exterior transmitters 2*a* and 2*b* of the vehicle unit 10. If it is determined that the communication enabled condition does not exist, corresponding to NO at S140, the process proceeds to S150. The collation ECU 4 determines whether an unlock condition exists, that is, whether the portable device 1 transmits the unlock signal for requesting the door 15 or 16 to unlock. When it is determined that an unlock requested condition exists and an unlock request is issued, it is assumed that a high likelihood exists that the driver will reuse the vehicle and the process proceeds to S200 whereupon the collation ECU 4 cancels the preparation for charging.

When communication is not enabled corresponding to NO at S140 and unlock is not requested corresponding to NO at S150, the process proceeds to S160. The collation ECU 4 continues the timing using the timer white maintaining the charging preparation state.

The process can start charging the battery when the driver is assumed to stop using the vehicle and will not use the vehicle for period of time after stopping.

The charging stop process in FIG. 4 will be described next. At S300, the collation ECU 4 determines whether the battery 14*a* is supplied with sufficient power and is fully charged. When the battery is fully charged, corresponding to YES at S300, the process proceeds to S330. The collation ECU 4 issues the charging stop instruction to the charging ECU 13 and the battery charger 20.

When the battery is not fully charged, corresponding to NO at S300, the process proceeds to S310. The collation ECU 4 determines whether the discontinued communication with the portable device 1 is resumed. When it is determined that the communication is resumed, corresponding to YES at S310, the process proceeds to S330 and the collation ECU 4 performs the above-mentioned charging stop process. When it is determined that the communication is not resumed, corresponding to NO at S310, the process proceeds to S320, the collation ECU 4 determines whether the portable device 1 transmits the unlock signal for requesting the door 15 or 16 to unlock. When it is determined that the unlock has been requested, corresponding to YES at S320, the process proceeds to S330 and the collation ECU 4 performs the above-mentioned charging stop process.

It should be noted that after the charging of the battery 14*a* starts, the collation ECU 4 can determine that the driver carrying the portable device 1 approaches the vehicle based on a determination that communication is enabled corresponding to YES at S310. Alternatively, if communication is not enabled, corresponding to NO at S310, the collation ECU 4 can determine that the driver has sent an unlock request to unlock the vehicle door corresponding to YES at S320. In such cases, it can be inferred with a high probability that use of the vehicle is imminent. The stop charging process at S330 is performed at the time when the driver is detected to approach the vehicle or when the driver issues an unlock request. Thus in accordance with various embodiments, the driver can start running the vehicle soon after getting into the vehicle.

While specific embodiments have been described herein, it is to be distinctly understood that the invention is not limited thereto but may be otherwise variously embodied within the spirit and scope of the invention.

According to an embodiment, for example, the vehicle unit includes the collation ECU 4, the body ECU 7, and the charging ECU 13. In alternative embodiments, the ECUs may be integrated when the necessary functions are implemented or, more ECUs may be used.

The operation for locking or unlocking the door may be performed on the independent operation sections such as the door handle and the lock switch as described in the embodiments or on a common operation section.

For example, if the battery charger 20 is installed in a parking area at home and the button on the portable device 1 is operated for a lock instruction to lock a front door at home.

The vehicle unit 10 may receive the lock instruction for the front door and may perform the charging stop process based on the lock instruction.

According to an embodiment, the portable device 1 and the vehicle unit 10 provide two functions as a so-called smart entry system and a keyless entry system but may provide either function in an independent manner only. In each case, a commercially available smart entry system or keyless entry system may be used as an equivalent to the portable device or the vehicle unit in the charging system according to the embodiment.

What is claimed is:

1. A charging system comprising:
   a battery charger installed near a parking position of a vehicle, the battery charger capable of charging a battery mounted on the vehicle during a charging operation;
   a portable device carried by a user of the vehicle, the portable device having a communication function;
   a vehicular communication device mounted on the vehicle for communicating with the portable device; and
   a battery charging control section mounted on the vehicle, the battery charging control section configured to:
      start the charging operation to charge the battery when the user is determined to be away from the vehicle; and
      stop the charging operation to charge the battery when the user is determined to be close to the vehicle,
   wherein the user is determined to be away from or close to the vehicle based on a first communication result between the vehicular communication device and the portable device.

2. The charging system of claim 1, further comprising a battery charger communication device that communicates with the portable device and the vehicular communication device,
   wherein the battery charger starts the charging operation when the user is determined to be away from the battery charger based on a second communication result between the batter charger communication device and one of the portable communication device and the vehicular communication device; and
   wherein the battery charger stops the charging operation when the user is determined to be close to the battery charger based on the second communication result.

3. The charging system of claim 2,
   wherein the portable device transmits a specific ID code to the battery charger communication device when communicating with the battery charger communication device; and
   wherein the battery charger starts or stops a charging operation in the battery charger based on a result of communication with the portable device when an ID code received by the battery charger communication device matches a registered ID code.

4. The charging system of claim 1, further comprising a battery charger communication device that communicates with the portable device and the vehicular communication device,
   wherein the battery charging control section supplies an instruction for the battery charger to start charging the battery and supplies the instruction for the battery charger to stop charging the battery; and
   wherein the instruction from the battery charging control section is supplied to the battery charger through the communication between the vehicular communication device and the battery charger communication device.

5. The charging system of claim 1, further comprising a battery charger communication device that communicates with the portable device and the vehicular communication device,
   wherein the battery charger starts charging when a user is determined to be away from the vehicle based on a second communication result between the portable device and the battery charger communication device;
   wherein the battery charger stops charging when a driver is determined to be close to the battery charger based on the second communication result;
   wherein the battery charging control section instructs the battery charger to start charging for starting charging of the battery and instructs the battery charger to stop charging for stopping charging of the battery;
   wherein the battery charging control section supplies an instruction to the battery charger through communication between the vehicular communication device and the battery charger communication device; and
   wherein the battery charger starts and stops a charging operation in the battery charger based on a first acquired one of communication with the portable device and an instruction from the battery charging control section.

6. The charging system of claim 1,
   wherein the portable device transmits a specific ID code to the vehicular communication device in order to communicate with the vehicular communication device; and
   wherein the battery charging control section starts and stops the charging operation for charging the battery based on the first communication result with the portable device when a received ID code received by the vehicular communication device matches a registered ID code.

7. The charging system of claim 1,
   wherein the vehicular communication device provides a communication area around the vehicle having a specified range and repeatedly transmits a request signal in the communication area;
   wherein the portable device enters the communication area, receives the request signal, and returns a response signal in response to the request signal;
   wherein the battery charging control section determines the user to be away from the vehicle when the vehicular communication device becomes incapable of receiving the response signal; and
   wherein the battery charging control section determines the user to be close to a vehicle when the vehicular communication device becomes capable of receiving the response signal.

8. The charging system of claim 7,
   wherein the vehicular communication device periodically transmits the request signal when the vehicle parks with a door thereof locked.

9. The charging system of claim 7, comprising:
   a lock operation section provided for a door of the vehicle, the lock operation section used for processing a lock instruction;
   an unlock operation section provided for a door of the vehicle, the unlock operation section used for processing an unlock instruction; and
   a lock/unlock control section that locks or unlocks a door of the vehicle in accordance with an operation of the user on the lock operation section and the unlock operation section,
   wherein, when an ID code contained in a response signal received by the vehicular communication device matches a registered ID code, the battery charging control section outputs an enabling signal that enables the lock/unlock control section to lock or unlock a door of the vehicle.

10. The charging system of claim 1,
wherein the communication device is provided with a lock operation section to be operated based on a lock instruction and an unlock operation section to be operated based on an unlock instruction;
wherein the lock operation section is operated to transmit a lock signal;
wherein the unlock operation section is operated to transmit an unlock signal;
wherein the vehicle includes a lock/unlock control section that locks or unlocks a door of the vehicle in response to reception of the lock signal or the unlock signal by the vehicular communication device;
wherein the battery charging control section determines the user to be away from a vehicle when the vehicular communication device receives the lock signal; and
wherein the battery charging control section determines the user to be close to a vehicle when the vehicular communication device receives the unlock signal.

11. A method for increasing a use availability of a vehicle requiring a charging operation to charge a battery thereof, the method comprising:
determining if the vehicle is stopped in a parking position sufficiently close to a battery charger to permit the charging operation to be performed;
determining whether a communication between a portable device and a communication unit associated with the battery charger is disabled for a specified period of time;
starting the charging operation if the communication between the portable device and the communication unit is disabled for the specified period of time; and
immediately stopping the charging operation if one of:
the communication between the portable device and the communication unit is enabled; and
an unlock request is received by the communication unit from the portable device to unlock the vehicle.

* * * * *